United States Patent [19]

Ellis, III

[11] Patent Number: 4,629,568
[45] Date of Patent: Dec. 16, 1986

[54] FLUID TREATMENT SYSTEM

[75] Inventor: George S. Ellis, III, Chardon, Ohio

[73] Assignee: Kinetico, Inc., Newbury, Ohio

[21] Appl. No.: 535,996

[22] Filed: Sep. 26, 1983

[51] Int. Cl.⁴ ............................................. B01D 13/00
[52] U.S. Cl. .................................... 210/636; 210/136; 210/257.2
[58] Field of Search ............... 210/257.2, 433.2, 321.1, 210/136, 134, 636

[56] References Cited

U.S. PATENT DOCUMENTS

| | | | |
|---|---|---|---|
| 3,493,495 | 2/1970 | Mendelson | 210/636 |
| 3,493,496 | 2/1970 | Bray et al. | 210/257.2 X |
| 3,498,910 | 2/1970 | Mendelson | 210/636 |
| 3,505,215 | 4/1970 | Bray | 210/136 |
| 3,616,921 | 11/1971 | Bray | 210/257.2 |
| 3,679,055 | 7/1972 | Clark et al. | 210/257.2 X |
| 3,746,640 | 7/1973 | Bray | 210/416.1 X |
| 3,786,924 | 1/1974 | Huffman | 210/257.2 |
| 3,846,295 | 11/1974 | Gibbs | 210/134 |
| 3,849,305 | 11/1974 | Mahjikian | 210/409 X |
| 3,939,074 | 2/1976 | Bray | 210/257.2 |
| 3,959,146 | 5/1976 | Bray | 210/257.2 |
| 3,992,301 | 11/1976 | Shippey et al. | 210/140 X |
| 4,124,488 | 11/1978 | Wilson | 210/416.1 X |
| 4,169,789 | 10/1979 | Lerat | 210/636 |
| 4,187,173 | 2/1980 | Keefer | 210/416.1 X |
| 4,190,537 | 2/1980 | Tondreau et al. | 210/257.2 |

FOREIGN PATENT DOCUMENTS

2180436  11/1973  France ................................ 210/636

Primary Examiner—Frank Spear
Attorney, Agent, or Firm—Watts, Hoffmann, Fisher & Heinke Co.

[57] ABSTRACT

Apparatus and method for purifying a solvent such as water, using a reverse osmosis process. The apparatus includes a reverse osmosis (R.O.) unit 10, a storage tank 24 for storing permeate produced by the reverse osmosis unit, and a flushing arrangement for cleansing the concentrate side of a reverse osmosis membrane at the conclusion of a purifying cycle. In one embodiment, the storage tank 24 communicates with the input to the R.O. unit through a check valve 26 which allows permeate flow from the tank into the R.O. unit but prevents reverse flow. A flow regulating arrangement 34, 40, 42 maintains one of two pressures at the concentrate output. A system controller 50 controls the communication of feed water to the R.O. unit and the concentrate pressure. At the conclusion of a purifying cycle, the system controller terminates the flow of feed water and reduces the concentrate output pressure resulting in the flow of a quantity of permeate from the storage tank into the R.O. unit to flush the concentrate's side of the membrane. In another embodiment of the invention, a separate flushing accumulator 100 receives permeate during a purifying cycle. When the cycle is terminated, the permeate stored in the accumulator is transferred to the input side of the R.O. unit and flushes the membrane. According to a feature of this embodiment, the R.O. unit 10', the flushing accumulator 100' and the system controller 110' are integrated in a unitary package which is relatively maintenance free.

34 Claims, 5 Drawing Figures

FLUID TREATMENT SYSTEM

DESCRIPTION

1. Technical Field

The present invention relates generally to fluid treatment systems and in particular to a method and apparatus for purifying water using the reverse osmosis principle.

2. Background Art

Various methods and apparatus are known for purifying solvents, particularly water. One such method utilizes the principle of reverse osmosis to reduce or eliminate the quantity of dissolved solids in a liquid. According to the reverse osmosis principle, a semipermeable membrane is used to separate the solvent from the dissolved solids. For example, in purifying water, a membrane is selected that exhibits greater permeability to water than the dissolved solids carried by the water. Raw feed water is applied to the membrane at a pressure generally greater than the osmotic pressure of the water. Under pressure, water passes through the membrane leaving behind the dissolved solids. The liquid passing through the membrane is generally termed "permeate" whereas the liquid remaining on the input side of the membrane is generally termed "concentrate" and is usually discarded to drain.

Since the concentration of solutes increases on the concentrate side of the membrane during the reverse osmosis process, precipitation of one or more of the dissolved solids can occur. This precipitation can cause plugging of the membrane thus lowering the efficiency of the process. In some systems, plugging or compaction of the membrane is compensated for by increasing the pressure of feed water. In other systems, the feed water is fed at a relatively high flow rate to cause turbulence in the vicinity of the membrane. Those employing this arrangement believe that the turbulence prevents the solids from adhering to the membrane. With this method however, a rather large quantity of feed water is discharged as concentrate.

In some systems, the membrane is subject to a continuous pressure by the feed water even during periods of non-use. It is believed that the application of continuous pressure to the membrane reduces its useful life.

DISCLOSURE OF THE INVENTION

The present invention provides a new and improved apparatus and method for purifying water or other solvent, using the reverse osmosis principle. The apparatus includes a reverse osmosis (R.O.) unit, that houses a semipermeable membrane which, as is known in the art, separates incoming or "feed" fluid into "concentrate" and "permeate". The concentrate is normally discarded to drain or alternately is transferred to another processing device such as another R.O. membrane unit. The permeate is the purified solvent and is usually conveyed to a storage device and/or tap. In the preferred embodiment of the invention, the membrane is periodically cleansed with permeate and is subject to full operating pressure only during a purifying cycle. Once a predetermined quantity of permeate has been produced and stored, the pressure across the membrane is reduced or terminated.

In the preferred and illustrated embodiment, the membrane unit forming part of the purifying system includes an input for fluid to be treated, an output for concentrate and an output for permeate. In addition to the membrane unit, the system includes a flow regulator for maintaining a predetermined pressure at the concentrate output of the membrane unit, a storage device such as a tank for storing permeate under pressure and a flushing arrangement for transferring a quantity of permeate to the input side of the membrane unit at the conclusion of a process cycle, to cleanse and reduce the pressure differential across the membrane. A system controller monitors the system operation and terminates the flow of fluid to the membrane unit when a predetermined quantity of permeate has been stored and effects the cleansing and pressure reduction cycle for the membrane. In the preferred embodiment, an inlet valve under the control of the system controller, controls the communication of the source of fluid to be treated with the input to the membrane unit such that during a process cycle, the inlet valve is opened to communicate the source with the unit.

According to one preferred and illustrated embodiment, the storage device communicates with the permeate output of the membrane unit. In addition, the storage device communicates with the input to the unit through a valve, preferably a check valve, that prevents the flow of source to the tank but allows the flow of permeate from the tank to the input under certain operating conditions. In this embodiment, the flow controller includes a flow regulator and pressure relief valve serially disposed in the concentrate output line. A fluid bypass arrangement, under the control of the system controller is disposed in a parallel fluid flow relationship with the flow regulator such that when it is activated by the system controller, fluid bypasses the flow regulator and the concentrate output pressure is determined by the pressure relief valve. When the fluid bypass is disabled, the concentrate output pressure is then determined by the flow regulator.

In the preferred method of operation, the system controller initiates a purifying cycle by communicating the source of fluid to be treated with the input to the membrane unit. Concurrently, the fluid by-pass is deactivated so that the flow regulator becomes operative to maintain a predetermined concentrate output pressure. The process cycle continues until the storage tank is pressurized to a predetermined pressure level. The system controller monitors the storage pressure and in response to sensing the predetermined level, closes the inlet valve to terminate the communication between the source and the input, and concurrently activates the fluid bypass to disable the flow regulator to establish a different, preferably lower concentrate output pressure. The reduction of pressure at the concentrate output causes an additional quantity of concentrate to be discharged into the conduit from the membrane unit. Since the inlet valve is closed, permeate from the storage tank enters the input of the membrane unit to replace the quantity of concentrate that was discharged. In so doing, the concentrate side of the membrane is flushed with permeate and the pressure differential across the membrane is reduced.

With this arrangement, membrane plugging due to precipitation or compaction as well as membrane failure due to continuously applied fluid pressure, is substantially reduced. With the present invention, it is believed that process efficiency is maintained at a relatively high level throughout the life of the membrane.

In this disclosed embodiment, the fluid by-pass arrangement includes a fluid control valve that opens upon receiving a signal from the system controller and closes in the absence of the signal. For purposes of explanation, the valve will be referred to as an outlet valve. In the preferred embodiment, both the inlet and outlet valves are similarly constructed and are preferably pilot pressure operated The system controller is connected to the valves and supplies the necessary fluid signals to either open or close the valves in response to sensed operating conditions. It must be recognized that other types of valves would also be suitable such as solenoid operated valves which would be activated by electrical signals supplied by an electrical system controller.

Another preferred embodiment of the solvent purifying system is also disclosed which includes a flush accumulator in addition to the storage device. According to this embodiment, permeate is fed to both the storage tank and the flush accumulator during a purifying cycle. When the storage tank is pressurized to its predetermined level, the system controller isolates the flush accumulator from the storage tank, terminates the communication of the source with the input to the reverse osmosis unit and communicates the flush accumulator with the input. Concurrently, the fluid bypass at the concentrate output is activated to reduce the output pressure to substantially zero thus causing further discharge of concentrate and a flow of permeate from the accumulator into the membrane unit. With this disclosed embodiment, at the conclusion of a purifying cycle, a predetermined amount of permeate, that is, the quantity stored in the flush accumulator is discharged into the membrane unit. Since the quantity of permeate entering the unit is limited by the amount stored in the flush accumulator, the concentrate output pressure can be reduced to substantially zero while still maintaining full storage tank pressure.

In accordance with this embodiment, a fluid pressure operated system controller controls the overall purifying process. The system controller includes a valve assembly that controls the communication of feed water to the membrane unit as well as the communication between the unit and the storage tank and flush accumulator.

In the preferred embodiment, the valve assembly includes a housing that slidably supports a valving member for movement between "on" and "off" positions. The valving member defines an inlet valve for controlling the communication of feed water with the membrane unit and a spool-like valve portion that controls the fluid communication between associated system control ports.

The valve assemby also includes a valve biasing member that cooperates with the valving member to define a differential piston arrangement. In the preferred embodiment, the biasing member is slidable on a shank defined by the valving member and defines an effective pressure area that is exposed to inlet pressure when the inlet valve opens. The valving member also defines a counter-effective pressure area exposed to storage tank pressure. A valve biasing spring, preferably captured by the biasing member exerts a valve opening force on the valving member when the member is in its "off" position. The spring force is selected to provide a force sufficient to drive the valving member to its "on" position when the storage tank pressure falls to a predetermined low level.

In accordance with the invention, the counter-effective pressure area defined by the valving member is larger than that defined by the biasing member so that a predetermined storage tank pressure, less than inlet pressure, will generate a valve closing force that is greater than the valve opening force (applied by inlet pressure through the biasing member). In the embodiment disclosed, the effective pressure areas on the valving member and the biasing member are configured such that a storage tank pressure of substantially ⅔ inlet pressure will produce a sufficient force on the valving member to move it to its "off" position to close the inlet valve and terminate a process cycle.

Once the inlet valve closes, the effective pressure area defined by the biasing member is isolated from the feed line pressure thus resulting in a substantial reduction in the biasing force tending to drive the valving member to its "on" position. The valving member remains "off" until the pressure in the storage tank is substantially decreased. In particular, the valve member remains "off" until the combination of inlet pressure on the inlet valve and the biasing force applied by the spring are sufficient to overcome the closure biasing force generated by the storage tank pressure. Once the inlet valve opens, inlet pressure acts on the biasing member driving it into engagement with the valving member thereby insuring that the inlet valve remains opened until the storage tank reaches the predetermined storage pressure as determined by the ratio between the effective pressure area defined by the valving member (to which storage tank pressure is applied) and the effective pressure area defined by the biasing member (to which inlet pressure is applied).

According to a feature of this embodiment, the system controller, the R.O. membrane and the flush accumulator form part of a unitary package that is relatively maintenance free. In the preferred and illustrated construction, the unit comprises a sealed canister-like housing that includes three fittings: one for a feed water input, one for permeate output and one for a drain connection through which concentrate and other waste water is discharged. The system controller is mounted at one end of the canister and controls the communication of feed water to an R.O. membrane located in a compartment within the canister as well as flushing of the membrane when a purifying cycle is terminated.

According to a feature of the invention, the flush accumulator is formed by an elastomeric member mounted around the membrane compartment. In the preferred embodiment, the member is tubular and is sealingly clamped inside the canister at both ends such that an inner expansible chamber is formed between an outside wall of the member and an inside wall of the canister and an outer chamber is formed between the outside of the membrane compartment and the inside of the elastomeric member.

The outer chamber forms the flushing accumulator and receives permeate from the membrane compartment, during a purifying cycle through a compartment output passage. The communication is terminated during the "off" cycle and the outer chamber is communicated with an input passage to the membrane compartment so that the permeate stored in the accumulator flushes the membrane. A provision is also made for precharging or pressurizing the inner chamber so that the permeate is stored under pressure in the accumulator and is thus fully discharged at the conclusion of a process cycle.

Additional features will become apparent and a fuller understanding obtained by reading the following de-

BEST MODE FOR CARRYING OUT THE INVENTION

Figure 1:
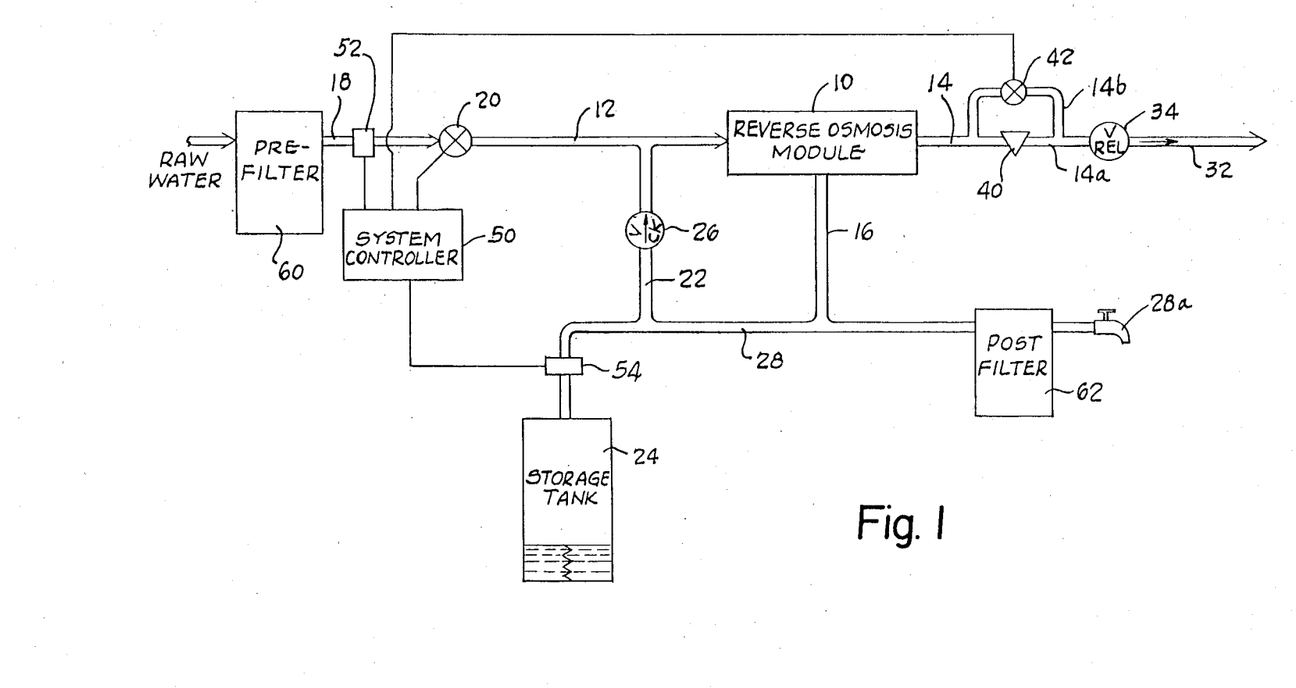
FIG. 1 is a diagrammatic representation of a solvent purifying system, utilizing the reverse osmosis principle, that is constructed in accordance with a preferred embodiment of the invention.

FIG. 1 schematically illustrates one preferred construction of a solvent purifying system embodying the present invention. For purposes of explanation, the disclosed apparatus and method will be described as a water purifying process and system. Those skilled in the art should recognize that the invention is applicable to the purification of solvents in general by reverse osmosis.

The system includes a reverse osmosis module 10 connected to an input conduit 12 through which feed water to be purified is communicated to the module. The module also communicates with output conduits 14, 16 through which "concentrate" and "permeate" are discharged, respectively, from the module. The module 10 operates in a conventional manner and includes a semipermeable membrane (not shown). According to the reverse osmosis principle, feed water supplied through the conduit 12 is applied to the membrane at a pressure greater than the osmotic pressure. Water passes through the membrane while dissolved solids in the feed water remain on the application side of the membrane and are eventually discharged into the concentrate conduit 14. The "permeate" is released into the permeate conduit 16.

As seen in FIG. 1, raw feed water is fed to the system through a conduit 18. A valve 20 controls the communication of the conduit 18 with the input conduit 12. A branch conduit 22 connects a pressurized storage tank 24 with the conduit 12. A check valve 26 disposed in the conduit 22 allows fluid flow from the storage tank 24 to the conduit 12 but prevents reverse flow.

The permeate conduit 16 communicates with a supply conduit 28 that includes a tap 28a. The supply conduit 28 is connected to the branch conduit 22 and also feeds permeate to the tank 24.

The concentrate output conduit 14 includes branch conduits 14a, 14b which merge together into a discharge conduit 32 that includes a pressure relief valve 34. The discharge conduit 32 normally dumps the concentrate to waste or drain (not shown). Alternately, as is known in the art, the conduit 32 may be connected to another solvent treatment apparatus, such as a second reverse osmosis unit to separate additional solvent from the concentrate.

The conduits 14a, 14b and pressure relief valve 34 form part of a flow controlling arrangement for maintaining predetermined pressures in the concentrate conduit 14. The concentrate branch conduit 14a includes a flow regulator 40 which is operative to maintain a predetermined pressure in the concentrate discharge line 14 thereby maintaining a predetermined back pressure in the reverse osmosis module. In general the pressure maintained by the flow regulator 40 is selected to produce a desired permeate quality and permeate quantity from the R.O. module.

The branch line 14b includes a control valve 42. As seen in FIG. 1, when the valve 42 is closed, the concentrate in the output conduit 14 is forced to pass through the flow regulator 40. When the valve 42 is open, the concentrate bypasses the flow regulator and flows directly to the discharge conduit 32. The pressure relief valve 34 in the discharge conduit 32 maintains a predetermined pressure in the output line 14 when the valve 42 is open. The relief setting of the valve 34 is adjusted to be slightly less than the pressure maintained by the flow regulator 40 so that when the valve 42 opens, the pressure in the concentrate output line 14 is reduced.

A system controller 50 controls the operation of the valves 20 and 42. According to the invention, the controller 50 opens or closes the valves 20, 42 in response to predetermined sensed pressures in the storage tank 24. Preferably, the controller 50 includes an arrangement for monitoring the feed water and storage tank pressures, shown schematically as sensors 52, 54. In the preferred embodiment, the control module 50 activates and deactivates the valves 20, 42 in response to sensing a predetermined pressure differential between the feed water and the storage tank 24.

The overall system operates as follows. When the storage tank 24 is empty, a rather large pressure differential is sensed between the feed water conduit 18 and the tank. At this sensed pressure differential, the control module 50 opens the valve 20 to allow feed water to enter the reverse osmosis module 10 via the conduit 12. Substantially concurrently with the opening of the valve 20, the valve 42 is closed so that concentrate in the conduit 14 is forced to pass through the flow regulator 40. With the flow regulator 40 in the flow path, a predetermined back pressure is maintained in the reverse osmosis module 10 rendering the unit operative to separate the feed water entering the module into concentrate and permeate. The permeate leaves the reverse osmosis module through the conduit 16 and assuming that the tap 28a is closed, the permeate enters the storage tank 24 by way of the conduit 28.

As the storage tank fills, the pressure rises. When the pressure in the tank 24 reaches a predetermined level which preferably is a function of the feed water pressure (such as a percentage of feed water pressure), the controller 50 deactivates the valve 20 to terminate the flow of feed water to the reverse osmosis module while simultaneously opening the valve 42 so that concentrate in the line 14 bypasses the flow regulator 40. As indicated previously, the pressure setting of the relief valve 34 is set below the control pressure of the flow regulator 40 so that the pressure in the concentrate discharge line 14 is reduced. This reduction causes some fluid flow out of the reverse osmosis module 10 through the pressure relief valve 34. Since the valve 20 is closed, the discharge of additional concentrate into the line 32 is compensated for by an equal amount of fluid flow into the R.O. unit from the storage tank 24, through the check valve 26 via the input conduit 12.

The permeate enters the reverse osmosis module and cleanses the membrane therein. In addition, the reduction of pressure in the concentrate line reduces the pressure differential across the membrane. Both of these factors reduce the stress level on the membrane and thus promote longevity.

When the volume in the storage tank 24 drops to a predetermined low level, the system controller sensing a resulting predetermined low pressure, reactivates the system. The valve 20 is opened to communicate feed water to the R.O. module and the valve 42 is closed so that the conduit 14 is repressurized to its operating pressure.

In the preferred system, a prefilter 60 is disposed in the feed water conduit 18 to filter out entrained solids and thus reduces the incidence of membrane plugging. A post filter 62 is preferably disposed in the outlet conduit 28 and reduces the trace amounts of impurities that pass through the membrane and may for example be simply a charcoal canister and act as a taste and odor enhancer.

The valves 20 and 42 are preferably pilot pressure operated and are opened and/or closed by the communication of fluid pressure from the system controller 50. Alternately, the valves may be opened by the communication of fluid pressure from the controller and closed in the absence of pilot pressure by a spring. The valves 20, 42 can also be electrically operated by an electronic system controller. Other arrangements including pneumatic or hydraulic valves and controllers are also contemplated. It should also be recognized that the pressure relief valve 34 can be replaced by other devices or valve arrangements.

Figure 2:
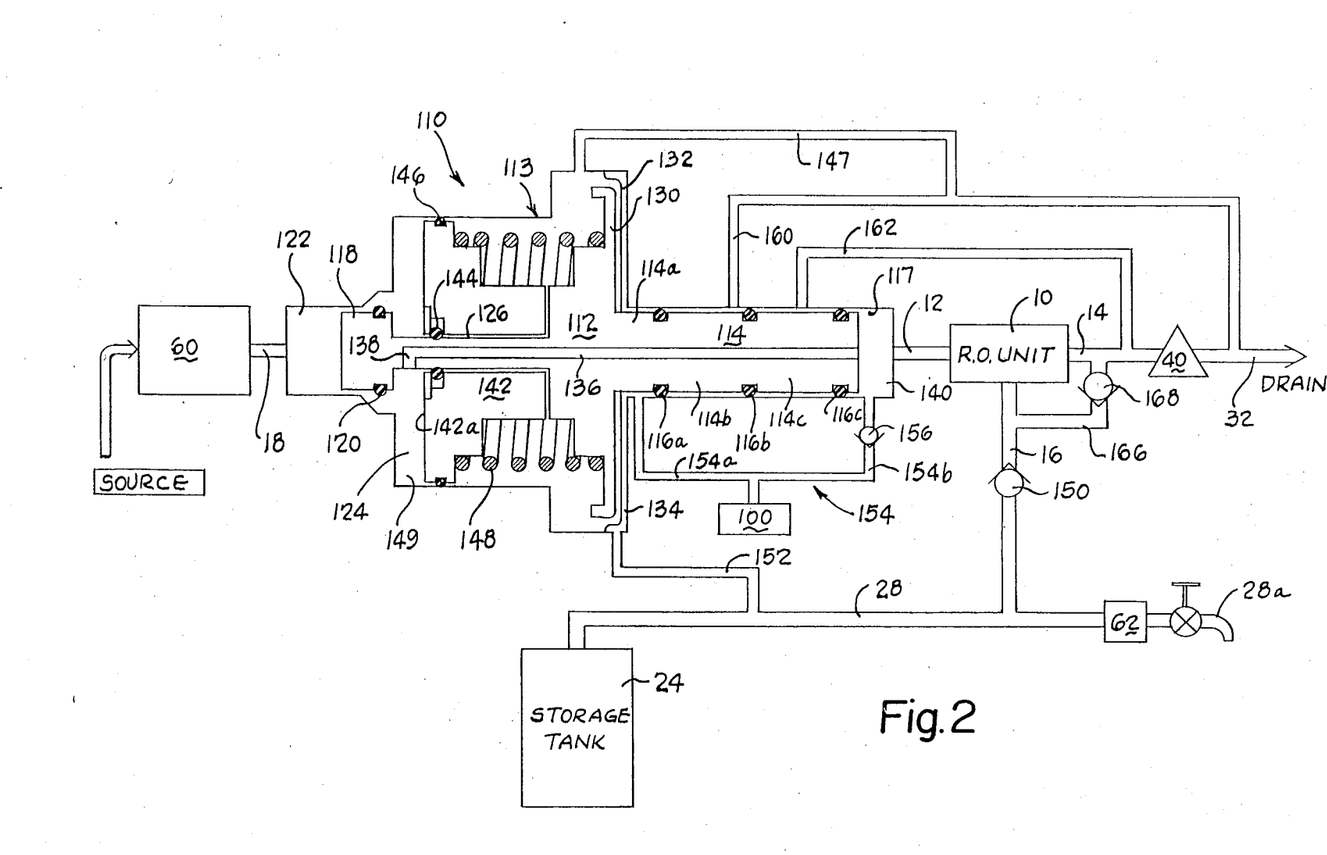
FIG. 2 is a diagrammatic representation of another embodiment of the solvent purifying system.

FIG. 2 schematically illustrates another preferred embodiment of the purifying system. To facilitate the description, components substantially similar to those disclosed and described in connection with FIG. 1, are denoted by like characters. It should also be noted that the components are not proportionately dimensioned in order to clarify the construction details of certain of the elements. Like the system disclosed in FIG. 1, the system shown in FIG. 2 includes an R.O. module 10 that receives feed water through an input conduit 12 and discharges concentrate and permeate into conduits 14 and 16. A flow regulator 40 pressurizes the concentrate conduit 14 during a purifying cycle. The supply conduit 28 communicates with the conduit 16 and supplies permeate to the pressurized storage tank 24 and the tap 28a. Pre and post filter elements 60, 62 are also included to treat the feed water and permeate, respectively, as described above.

Unlike the embodiment shown in FIG. 1, the R.O. module is flushed with permeate stored in a separate flush accumulator 100, at the conclusion of a process cycle. With this system configuration, a controlled amount of permeate (that stored in the accumulator) is transferred to the input side of the R.O. membrane (not shown in FIG. 2) when a purifying cycle is terminated.

The overall operation of the system is controlled by a fluid pressure operated system controller, indicated generally by the reference character 110. The controller includes a valve member 112 reciprocally mounted within a controller housing 113. The member is movable between "on" and "off" positions. In the "on" position (shown in FIG. 2), raw feed water is communicated to the R.O. unit 10 and permeate from the R.O. unit is communicated to the flushing accumulator 100 (and storage tank 24). In the "off" position, the flow of feed water to the R.O. unit is terminated and the flushing accumulator is isolated from the permeate output of the R.O. unit and is instead communicated with the input to the R.O. unit. Finally, the controller also controls the pressurization of the concentrate conduit 14. In the "on" position, the flow regulator 40 is enabled, thus pressurizing the conduit 14. In the "off" position, the regulator 40 is by-passed in order to reduce or terminate pressurization of the conduit 14 and hence the membrane in the R.O. unit.

To accomplish these functions, the valving member includes a spool portion 114 that is divided into three fluid flow controlling segments 114a, 114b, and 114c, by O-rings 116a, 116b, 116c. The spool portion is slidable in a bore 117 formed in the housing 113 with which a plurality of fluid ports (not shown) communicate. The control ports, in turn, communicate passages and conduits with the bore 117 and hence the spool portion 114 controls the fluid communication between the passages. The opposite end of the valving member defines a cylindrical inlet valve element 118 that carries an O-ring 120. The inlet valve 118 is reciprocally movable in a bore 122 defined by the valve controller housing 113. When the spool moves to its leftward position (as viewed in FIG. 2), the O-ring 120 sealingly engages the bore 122 and terminates the flow of feed water from the conduit 18 into the controller. In the rightward position, as shown in FIG. 2, feed water is allowed to proceed from the conduit 18 into the region designated by the reference character 124. The inlet valve 118 is connected to the remainder of the valving member 112 by a shank 126. The member 112 also includes an enlarged diameter portion 130 intermediate the inlet valve 118 and the spool portion 114. A diaphragm 132 sealingly engages the housing 113 and the valving member to define an isolated fluid flow region 134 between the housing 113 and the enlarged diameter portion 130.

An axial passage 136 and a connecting radial passage 138 communicates the valve region 124 with an end bore 140 defined between the right end of the spool portion 114 and the bore 117. A biasing member or piston 142 is slidable along the shank 126 and includes O-rings 144, 146 which sealingly engage the shank 126 and the inside of the valve housing 113. A biasing spring 148 is captured between the piston 142 and the enlarged diameter portion 130. The region beteween the biasing piston 142 and the enlarged diameter portion 130 of the valving member is vented to drain through a conduit 147. The conduit 147 prevehts this region from pressurizing which would hinder relative movement between the piston 142 and the valving member 112.

In FIG. 2, the system controller is shown in its "on" mode, that is, the position it assumes when the system is in a purifying cycle. Just prior to the opening of the inlet valve, the biasing piston 142 is located at its left most position against a shoulder 149, formed in the housing. As the inlet valve opens, feed water entering the region 124 generates a substantial force on a left face 142a of the piston and eventually overcomes the spring force and drives the biasing piston 142 to its right most position, shown in FIG. 2, thereby driving the valving member 112 to its right most position (shown in FIG. 2), thus fully opening the inlet valve 118.

In the position shown in FIG. 2, feed water from the conduit 18 is communicated to the input conduit 12 of the R.O. module 10 by the passages 136, 138 formed in the shank 126. Permeate produced by the R.O. unit is discharged into the supply conduit 28 via the conduit 16 and a check valve 150. The check valve 150 allows unimpeded flow of permeate from the R.O. unit to the conduit 28 but prevents reverse flow. The supply conduit 28 not only supplies the storage tank 24 with permeate but also feeds a branch conduit 152 that communicates permeate to the accumulator 100. In particular, the conduit 152 communicates with the region 134 defined between the diaphragm 132 and the housing 113 which in turn is communicated to an accumulator feed conduit 154 having input/output portions 154a, 154b by the segment 114a of the spool portion. The conduit portion 154b also communicates with the end bore 140 through a check valve 156.

In general, the permeate pressure is less than the pressure of feed water and thus the check valve 156 prevents permeate from entering the and bore 140, during a purifying cycle. The permeate flowing to the accumulator via the branch conduit 152, the region 134 and the conduit 154 also applies a biasing force to the enlarged diameter portion 130, urging the spool portion 114 towards the left (as viewed in FIG. 2). Since the diameter against which the permeate pressure is applied is substantially larger than the diameter of the biasing piston 142, a permeate pressure less than feed water pressure will produce a force on the valving member 112 sufficient to overcome the force exerted by feed water on the biasing piston 142. When the force generated by permeate is greater than that generated by the feed water, the valving member 112 will be driven leftwardly to terminate the flow of feed water from the conduit 18 into the region 124 thus putting the system controller in an "off" state and terminating the purifying cycle. The permeate pressure that will produce this leftward movement in the valving member 112 is determined by the ratio between the effective pressure area of the enlarged diameter portion 130 and the area 142a of the biasing piston 142. In the embodiment illustrated, the ratio of areas is approximately two-thirds so that a permeate pressure equal to $\frac{2}{3}$ line pressure will effect closure of the valving member 112.

When the valving member shifts to the left, the O-ring seal 116a will terminate the communication between the diaphragm enclosed region 134 and the flush accumulator supply conduit 154. The segment 114c will be positioned between and hence fluidly interconnect a pair of by-pass conduits 160, 162. As a result, the concentrate conduit 14 will be depressurized since concentrate will be able to by-pass the flow regulator 40 through the branch conduits 160, 162 thus completely depressurizing the concentrate side of the R.O. unit and discharging concentrate to the drain conduit 32. Since the flushing accumulator 100 contains a pressurized source of permeate, the reduction in pressure in the input conduit 12 that results when additional concentrate is discharged to drain, will enable permeate to flow through the check valve 156 into the end bore 140 and into the R.O. unit 10 via the conduit 12. This flow of permeate flushes the R.O. unit. The permeate side of the R.O. unit is depressurized through a by-pass conduit 166 that includes a check valve 168. During a purifying cycle the pressurization of the conduit 14 prevents the flow of permeate through the check valve 168. However, once the cycle has been terminated and the pressure reduced in the conduit 14, any residual permeate pressure in the conduit 16 will be discharged through the conduit and check valve 166, 168.

Figure 3:
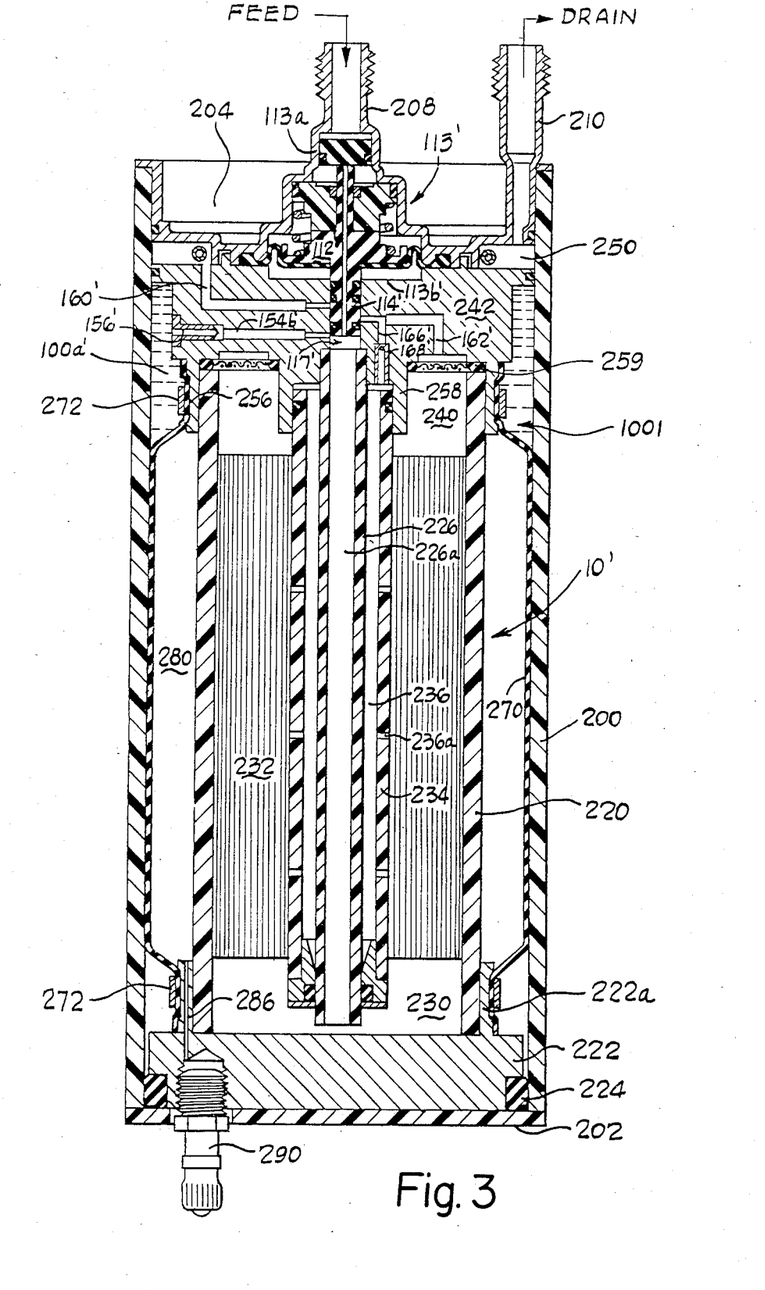
FIG. 3 is a sectional view of an apparatus that embodies the system illustrated schematically in FIG. 2 showing a system controller in an "off" position and as seen from the plane indicated by the line 3—3 in FIG. 5.
Figure 4:
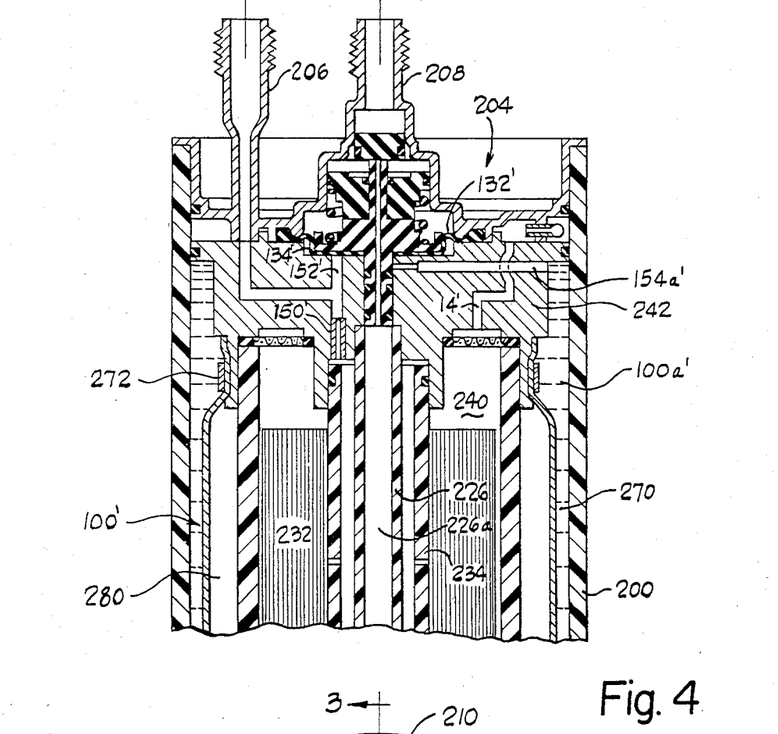
FIG. 4 is a fragmentary sectional view of the apparatus shown in FIG. 3, illustrating the "on" position for the system controller and as seen from the plane indicated by the line 4—4 in FIG. 5; and, FIG. 5 is an end view of the apparatus shown in FIG. 3.
Figure 5:
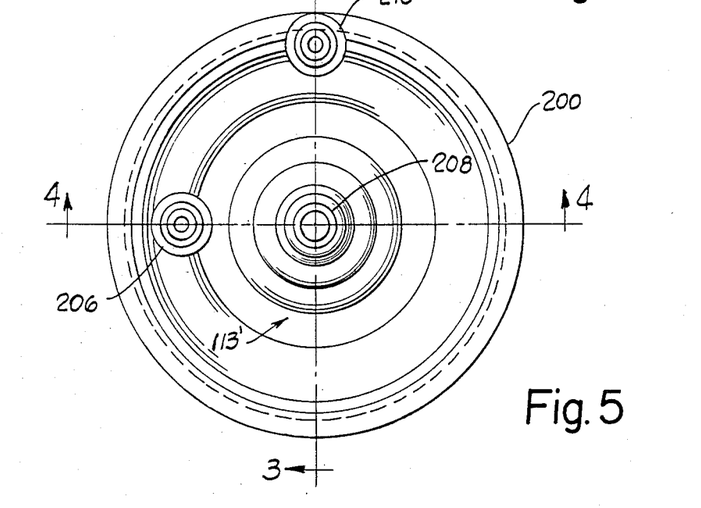

Turning now to FIGS. 3–5, an assembly is illustrated which embodies the invention shown schematically in FIG. 2. The assembly comprises a cartridge which mounts and integrates the individual components shown in FIG. 2 such as the R.O. unit and the system controller labeled 10 and 110 in FIG. 2. In order to facilitate the description, components and passages in the cartridge assembly which correspond to individual components and conduits in FIG. 2 are accorded the same reference character suffixed by an apostrophe ('). For example, the system controller indicated by the reference character 110 in FIG. 2 is indicated by the reference character 110' in FIGS. 3 and 4. In addition, some of the passages illustrated in the sectional views of the cartridge, are shown slightly out of position, in order to facilitate the description.

As seen best in FIG. 5, the canister-like assembly is substantially cylindrical. Referring also to FIGS. 3 and 4, the assembly includes a cylindrical, outer housing wall 200, a bottom end cap 202 and a top end cover indicated generally by reference character 204. The top cover 204 defines integral, threaded fittings 206, 208 and 210. Permeate is discharged through the fitting 206 and typically would be connected to a storage tank (element 24 in FIG. 2) and/or a tap (element 28a in FIG. 2). A source of raw feed water is connected to the fitting 208 whereas the fitting 210 is connected to drain.

As seen best in FIG. 3, an R.O. unit indicated generally by the reference character 10' is located centrally within the cartridge. The R.O. unit is a substantially sealed compartment having fluid connections to other parts of the cartridge assembly. The compartment comprises a cylindrical wall 220 mounted centrally within the outer housing wall 200. The lower end of the wall 220 (as viewed in FIG. 3) is sealingly received by a base 222 that includes an upwardly extending axial flange 222a. The base in turn sealingly engages the outer wall 200 and the end cap 202 through an O-ring 224. A feed tube 226 defining a feed passage 226a extends centrally and communicates a bore 117' with a region 230 that forms the input side of a reverse osmosis membrane 232. As is conventional, the membrane 232 is rolled and sealingly engages the inside of the wall 220. The membrane 232 is rolled around a perforate collector tube 234 that surrounds the feed tube 226 and defines a passage 236 for receiving permeate. In operation, the feed water, under pressure, enters the lower end of the rolled membrane. Permeate travels radially and enters the receiving passage 236 through perforations 236a in the collector tube. Concentrate travels axially through the entire membrane roll and is received in a concentrate collection chamber 240.

An intermediate housing member 242 is located just below the top cover 204 and sealingly engages the inside of the outer housing wall 200. The intermediate housing member defines a lower portion 113b' of the valve housing 113' and a plurality of passages which communicate other parts of the assembly with the valve 110', the R.O. unit 10' and the fittings 206, 208, 210. The intermediate housing member also mounts check valves 150', 156' and 168' which correspond to the check valves 150, 156 and 168 on FIG. 2.

A spool portion 114' of the valve member 112' is slidably received in the bore 117' formed in the intermediate housing member 242. A drain region 250 is defined between the intermediate member 242 and the top cover 204 and communicates with the drain connection 210. A by-pass passage 160' connects the drain region with the bore 117'. The spool portion 114 controls the communication of the passage 160' with another by-pass passage 162'. As seen in FIG. 2, during a purification cycle the concentrate output of the R.O. unit is pressurized or restricted by the flow regulator 40. In the embodiment illustrated in FIGS. 3-5, the flow restriction is provided by a length of capillary tube 40' which restricts the flow of concentrate from the passage 14' to the drain region 250. It should be recognized that the length of the tube 40' can vary and that the tube itself can be replaced by other types of flow restrictors.

The intermediate housing member 242 includes two concentric, downwardly depending axial flanges 256, 258. The flange 256 receives the membrane compartment wall 220 whereas the inner flange 258 receives the collector tube 236. The annual space defined between the flanges 256, 258 forms the concentrate receiving collection chamber 240. In the embodiment illustrated, a filter disk 259 is disposed at the upper end of the concentrate receiving region 240 and filters the concentrate prior to entering the discharge passage 14' (shown in FIG. 4) and the bypass passage 162' (shown in FIG. 3).

The flushing accumulator is indicated generally by the reference character 100' in FIGS. 3 and 4. The accumulator comprises an elastomeric, tubular bladder-like element 270, the ends of which are clamped to the outside of the flanges 256 and 222a by band clamps 272. As seen in FIG. 4, the region between the outside of the bladder and the inside of the housing wall 200 (indicated by the reference character 100a') receives permeate through a spool controlled passage 154a' formed in the intermediate housing member 242. When the valve 110 is in its "on" position as shown in FIG. 4, permeate travels from the receiving passage 236 to the passage 154a' by way of the check valve 150', the passage 152' and the region 134' defined between the diaphragm 132 and the valve housing.

In order to store the permeate in the flushing accumulator 100' under pressure, a region 280 defined between the inside of the bladder 270 and the outside of the membrane compartment wall 220 is pressurized with a suitable gas such as nitrogen. A fitting 290 (shown in FIG. 3) threadedly received in the base 222 communicates with the region 280 through a short passage 286 formed in the base and flange 222, 222a.

As seen in FIG. 3, when the system control 110' is in its "off" position, the valving member 112' is in its uppermost position. Referring also to FIG. 4, with the spool portion 114' in the upper position (shown in FIG. 3), the concentrate receiving region 240 is communicated directly to the drain region 250 by way of the spool controlled by-pass passages 160',162'. In residual permeate pressure in the permeate receiving passage 236 is also discharged to drain through a check valve 168' and passage 166' while communicating with the by-pass passage 162'. As seen in FIG. 3, with the valving member 112' in its uppermost position, the passage 154b' is communicated with the bore 117' and hence the feed tube passage 226. As a result, permeate is forced from the flushing accumulator 100' by the bladder 270 and into the feed tube 226 by way of a passage 154b' and check valve 156'.

The disclosed construction is intended to serve as a self contained reverse osmosis purifying package that requires little or no maintenance. Installation of a purifying system using the disclosed cartridge is greatly simplified; connecting to a storage tank, dispensing tap, drain and feed water source conduit are all that is necessary. The other components of the system are fully contained and virtually encapsulated within the cartridge. It is believed that the cartridge can be permanently sealed as by ultrasonic welding etc., and can be treated as a disposable item in that it can be simply discarded when the quality of permeate falls below acceptable standards. Most, if not all, of the parts forming the cartridge lend themselves to high speed fabrication techniques such as injection molding and therefore the overall unit is relatively inexpensive as compared to other commercially available purifying system components.

It also should be noted that the disclosed purifying system can be made part of a comprehensive water treatment system which may include not only reverse osmosis purification but water softening as well. The resulting modular construction of the system would enable simple replacement of worn or failed components such as the cartridge without requiring excessive down time for the overall system.

Although the invention has been described with a certain degree of particularity, it should be understood by those skilled in the art that various changes can be made to it without departing from the spirit or scope of the invention as hereinafter claimed.

I claim:

1. A system for purifying water utilizing a reverse osmosis process, comprising:
    (a) a reverse osmosis unit having an input for feed water to be treated and outputs from which concentrate and permeate are separately discharged;
    (b) pressure controlling means for maintaining predetermined fluid pressures at the concentrate output of the reverse osmosis unit;
    (c) inlet valve means selectively operable to communicate the source of feed water with the input to said reverse osmosis unit;
    (d) pressurized storage means for storing permeate produced by said reverse osmosis unit;
    (e) check valve means communicating said storage means with said feed water input of said reverse osmosis unit, said check valve means operative to allow fluid flow from said storage means to said input while preventing reverse flow;
    (f) a fluid pressure operated system responsive to pressure in said storage means and operative to close said inlet valve means and reduce the pressure at the concentrate output to provide fluid flow from said storage tank to said check valve and into the input to said reverse osmosis unit.

2. The apparatus of claim 1 wherein said system controller monitors the line pressure of said feed water and closes said inlet valve means when the pressure in said storage means reaches a predetermined value, that is related to the line pressure of said feed water.

3. The apparatus of claim 1 wherein said pressure controlling means comprising an outlet valve in series with a pressure relief valve and a flow regulating means in parallel with said outlet valve such that when said outlet valve is closed, concentrate from said reverse osmosis unit passes through said flow regulating means and then said relief valve and when said outlet valve is open, concentrate by-passes said flow regulating means and proceeds directly to said relief valve.

4. The apparatus of claim 1 further comprising a prefilter for feed water and a post filter for permeate.

5. A method for purifying water by reverse osmosis, comprising the steps of:

(a) providing a reverse osmosis unit having an input for feed water to be treated and outputs for discharging concentrate and permeate;
(b) communicating said permeate output with a pressurized storage means;
(c) providing a fluid path from said storage means to said feed water input while preventing reverse flow;
(d) communicating a source of feed water to be treated with said input while maintaining a first concentrate pressure at said concentrate output;
(e) sensing the pressure in said storage means and upon sensing a predetermined permeate storage pressure, terminating the communication between the source of feed water and said input while reducing the concentrate pressure at said concentrate output to a second concentrate pressure, less than said first concentrate pressure such that fluid flow from said storage means to said input occurs.

6. For a reverse osmosis, solvent purifying system having an input for receiving fluid to be treated from a source, an output for concentrate and an output for permeate, and a storage means for receiving and storing permeate, a system controller comprising:
(a) a valve assembly including a valve housing;
(b) a valving member, supported within said housing and movable between system on and system off positions;
(c) said valving member including means for controlling the communication of fluid to be treated with said input;
(d) a pressure controlling means operable to maintain at least two different predetermined pressures at said concentrate output under respective predetermined operating conditions; and,
(e) fluid pressure operated flushing control means operative to transfer a quantity of permeate to said input when said valving member moves to its off position.

7. The system controller of claim 6 further including a differential piston means for sensing and comparing the pressure of permeate in said storage means with the pressure of said source of fluid to be purified and being operative to shift said valving member between said on and off positions, upon sensing predetermined source fluid and permeate pressures.

8. The system controller of claim 6 further comprising:
(a) a biasing piston defining an effective pressure area exposed to source fluid pressure when said valving member is in its on position, said biasing piston including means for exerting a biasing force on said valving member urging it towards said on position;
(b) said valving member defining an inlet valve for controlling the communication of the fluid source with said input, a counter-effective pressure area exposed to permeate pressure, and a spool portion slidably carried in a bore formed in said housing, said spool portion operative in control fluid communication between fluid passages communicating with said bore.

9. The system controller of claim 6 wherein said inlet valve is connected to said spool portion by a shank and said biasing piston is slidable along said shank.

10. The system controller of claim 6 wherein the countereffective pressure area defined on said valving member is larger than the effective pressure area defined on said biasing piston.

11. The system controller of claim 6 further including a biasing spring for exerting a spring biasing force on said valving member urging it towards its on position.

12. The system controller of claim 8 wherein said biasing piston is movable into engagement with said valving member to apply a fluid generated biasing force to said valving member urging it towards its on position.

13. The system controller of claim 8 wherein said spool portion is operative to control the fluid communication between a flushing accumulator and said input.

14. A fluid treatment system, comprising:
(a) a reverse osmosis unit including an input for fluid to be treated, a concentrate output and a permeate output;
(b) a source of fluid to be treated including a conduit communicating with said input;
(c) flow controlling means for maintaining a predetermined pressure at said concentrate output;
(d) storage means communicating with said permeate output including valve means for allowing fluid flow from said output to said storage means but preventing reverse flow;
(e) flushing means including means for accumulating permeate from said permeate output and valve means allowing fluid flow from said accumulating means to said input but preventing reverse flow;
(f) first valve means for controlling the communication between said source of fluid to be treated and said input;
(g) second valve means for controlling the communication between said permeate output and said flushing means; and
(h) system controller means including means for communicating said source with said input, and said permeate output with said flushing means until a predetermined fluid pressure is reached in said storage means, said controller including means responsive to said predetermined storage pressure operative to terminate communication between said source and said input, and said permeate output and said accumulating means and further operative to render said flow controller ineffectual to substantially reduce the pressure at said concentrate output thereby providing fluid flow from said flushing means to said input.

15. A system for purifying a solvent such as water or the like, comprising:
(a) a reverse osmosis unit having an input for fluid to be treated, a concentrate output and a permeate output;
(b) a source of fluid to be treated including means for communicating said source with said input;
(c) flow regulating means for maintaining a predetermined pressure at said concentrate output;
(d) storage means communicating with said permeate output for storing permeate under pressure;
(e) flushing means including means for communicating permeate to said input, under predetermined system operating conditions, to flush the concentrate side of a membrane forming part of said reverse osmosis unit;
(f) a system controller including means responsive to pressure in said storage means operative to cause said flow regulating means to reduce the pressure at said concentrate output and further operative to terminate communication between said source of fluid to be treated and said input, thereby enabling a quantity of permeate to flow from said flushing means and said input.

16. The apparatus of claim 15 wherein said flushing means comprises a conduit and check valve communicating said storage means with said input to said reverse osmosis unit, said check valve allowing fluid flow from said storage means to said input but preventing reverse flow.

17. The apparatus of claim 15 wherein said flushing means comprises a fluid accumulator including means for receiving permeate from said output and means for communicating fluid from said accumulator to said input under predetermined operating conditions.

18. The apparatus of claim 15 wherein said flow controlling means comprises a flow regulator and pressure relief valve disposed in serial communication with said concentrate output, and a fluid by-pass means disposed in a fluid parallel relationship with said flow regulator, said by-pass means activated and deactivated by said system controller in response to predetermined operating conditions.

19. The apparatus of claim 15 wherein said flow regulating means comprises a flow regulator disposed in serial fluid communication with said concentrate output and a fluid by-pass means disposed in a fluid parallel relationship with said flow regulator, said by-pass means activated and deactivated by said system controller in response to predetermined operating conditions.

20. The apparatus of claim 18 wherein said fluid by-pass means is activated to disable said flow regulator when said storage means reaches a predetermined fluid pressure.

21. The apparatus of claim 20 wherein said predetermined pressure in said storage means is substantially of $\frac{2}{3}$ source pressure.

22. Apparatus for purifying solvents such as water by reverse osmosis, comprising:
(a) a housing defining an inlet for feedwater to be treated, an outlet for permeate and an outlet for discharging waste;
(b) a reverse osmosis membrane located in a compartment disposed within said housing including an input for receiving feedwater to be treated, an output for permeate and an output for discharging concentrate;
(c) storage means communicating with the permeate output of said membrane compartment;
(d) a membrane flushing chamber formed by an elastomeric member surrounding said membrane compartment including means for receiving permeate from said reverse osmosis membrane compartment, said flushing chamber operative to store a predetermined quantity of permeate; and,
(e) control means operative to terminate fluid communication between said storage means and said permeate output including flushing control means operative to discharge permeate from said flushing chamber into the reverse osmosis compartment at the conclusion of a purifying cycle.

23. The apparatus of claim 22 further comprising a system controller for controlling an on and off cycle of said apparatus including means for controlling the communication of said inlet with said input to the membrane compartment, said controller further including means for controlling pressure of the concentrate output of said membrane compartment.

24. The apparatus of claim 22 wherein said housing is substantially cylindrical and said membrane compartment is disposed in axial alignment with said housing and said means for receiving feed water to be treated comprises a tube disposed along the central axis of said housing.

25. The apparatus of claim 22 further including means for precharging said expansible chamber so that permeate received by said chamber is stored under pressure.

26. Apparatus for purifying a solvent such as water by reverse osmosis, comprising:
(a) a substantially cylindrical housing having an end cover defining an inlet for water to be treated, an outlet for permeate, and an outlet for waste;
(b) a reverse osmosis module disposed axially within said housing, said module comprising:
(i) an input tube disposed axially with respect to said housing;
(ii) a perforate collector tube surrounding said input tube and defining a permeate collection region between the inside of said collection tube and the outside of said input tube;
(iii) a reverse osmosis membrane disposed around said collector tube and extending into abutting engagement with an inside wall of said module;
(c) an intermediate housing member disposed intermediate said end cover and said reverse osmosis module, said intermediate housing member defining a plurality of fluid passages;
(d) a system controller including structure defined by said end cover and said intermediate member for slidably supporting a valving member for movement between on and off positions;
(e) a flushing accumulator defined by a tubular elastomeric member clamped around said reverse osmosis module, the region on one side of said member defining a permeate receiving chamber and a region defined on another side of said member forming a precharge chamber;
(f) said valving member of said system controller defining a valve element for controlling the communication of said inlet with said input to said reverse osmosis module and further defining a valve portion for controlling the communication of said plurality of fluid passages with said reverse osmosis module and said flushing acumulator.

27. The apparatus of claim 26 wherein said system controller includes an enlarged diameter portion defining a counter-effective pressure area exposed to permeate pressure at said permeate outlet, said permeate pressure urging said valving member towards its off position and said system controller further includes a biasing means defining an effective pressure area exposed to feed water when said inlet valve is open, said biasing means urging said valving member towards its on position.

28. The apparatus of claim 26 wherein said housing is canister-like and said end cover is permanently secured and sealed to provide a substantially maintenance free, self contained purification system.

29. Apparatus for purifying solvent such as water by reverse osmosis, comprising:
(a) a housing defining an inlet for feedwater to be treated, an outlet for permeate and an outlet for discharging waste;
(b) a reverse osmosis membrane located in a compartment disposed within said housing including an input for receiving feedwater to be treated, an output for permeate and an output for discharging concentrate;

(c) pressurizing means operative to maintain a predetermined pressure at the concentrate output of said membrane compartment during a purifying cycle;

(d) an expansible chamber formed by an elastomeric member surrounding said membrane compartment including means for receiving permeate from said membrane compartment; and, (e) control means operative to discharging permeate from said expansible chamber into the reverse osmosis compartment at the conclusion of a purifying cycle, including pressure reducing means for reducing the pressure at said concentrate output whereby a fluid flow rate of fluid from said concentrate output is increased when said permeate is being discharged by said expansible chamber.

30. The apparatus of claim 29 wherein said pressure control means includes a flow restriction means and said means for reducing pressure at said concentrate output comprises a passage for by-passing said flow restriction means.

31. Apparatus for purifying solvent such as water by reverse osmosis, comprising:

(a) a housing defining an inlet for feedwater to be treated, an outlet for permeate and an outlet for discharging waste;

(b) a reverse osmosis membrane located in a compartment disposed within said housing including an input for receiving feedwater to be treater, an output for permeate and an output for discharging concentrate;

(c) a storage means communicating with said permeate outlet defined by said housing, for storing a first predetermined quantity of permeate under pressure;

(d) an expansible flushing chamber formed by an elastomeric member surrounding said membrane compartment including means for receiving permeate from said reverse osmosis compartment, said expansible chamber operative to store a second predetermined quantity of permeate, said second predetermined quantity being substantially less than said first predetermined quantity stored by said storage means; and, (e) means for discharging permeate from said flushing chamber into the reverse osmosis compartment at the conclusion of a purifying cycle.

32. The apparatus of claim 31 further including pressure controlling means for maintaining a predetermined pressure at said concentrate output during a purifying cycle and being further operative to substantially reduce said pressure at said concentrate output at the conclusion of said purifying cycle such that the permeate from said expansible chamber is allowed to flow to said outlet for discharging waste defined by said housing at a flow rate greater than the flow rate of concentrate to said outlet during a purifying cycle.

33. Apparatus for purifying solvents such as water by reverse osmosis, comprising:

(a) a housing defining an inlet for feedwater to be treated, an outlet for permeate and an outlet for discharging waste;

(b) a reverse osmosis membrane located in a compartment disposed within said housing including an input for receiving feedwater to be treated, an output for permeate and an output for discharging concentrate;

(c) an expandsible chamber formed by an elastomeric member surrounding said membrane compartment including an inlet for receiving permeate from said reverse osmosis compartment; and, (d) control means including a valve operative at the conclusion of a purifying cycle to connect said expansible chamber inlet with said membrane compartment input to allow permeate to flow from said expansible chamber directly into said input of the membrane compartment.

34. A system for purifying water utilizing a reverse osmosis process, comprising:

(a) a reverse osmosis unit having an input for feed water to be treated and outputs from which concentrate and permeate are separately discharged;

(b) pressure controlling means for maintaining predetermined fluid pressures at the concentrate output of the reverse osmosis unit;

(c) inlet valve means selectively operable to communicate the source of feed water with the input to said reverse osmosis unit;

(d) presusrized storage means for storing permeate produced by said reverse osmosis unit;

(e) a conduit and check valve means directly communicating said storage means with the feed water input to said reverse osmosis unit, said conduit and check valve means operative to allow direct fluid flow from said storage means to said reverse osmosis input while preventing reverse flow;

(f) a system controller responsive to pressure in said storage means and operative to close said inlet valve means and reduce the pressure at the concentrate output to provide fluid flow from said storage tank to said check valve and into the input to said reverse osmosis unit.

* * * * *